May 18, 1926.
C. OLIVER
1,585,508
RESONANCE ARRANGEMENT PARTICULARLY APPLICABLE TO ELECTRIC RELAYS
Filed April 18, 1924   2 Sheets-Sheet 1
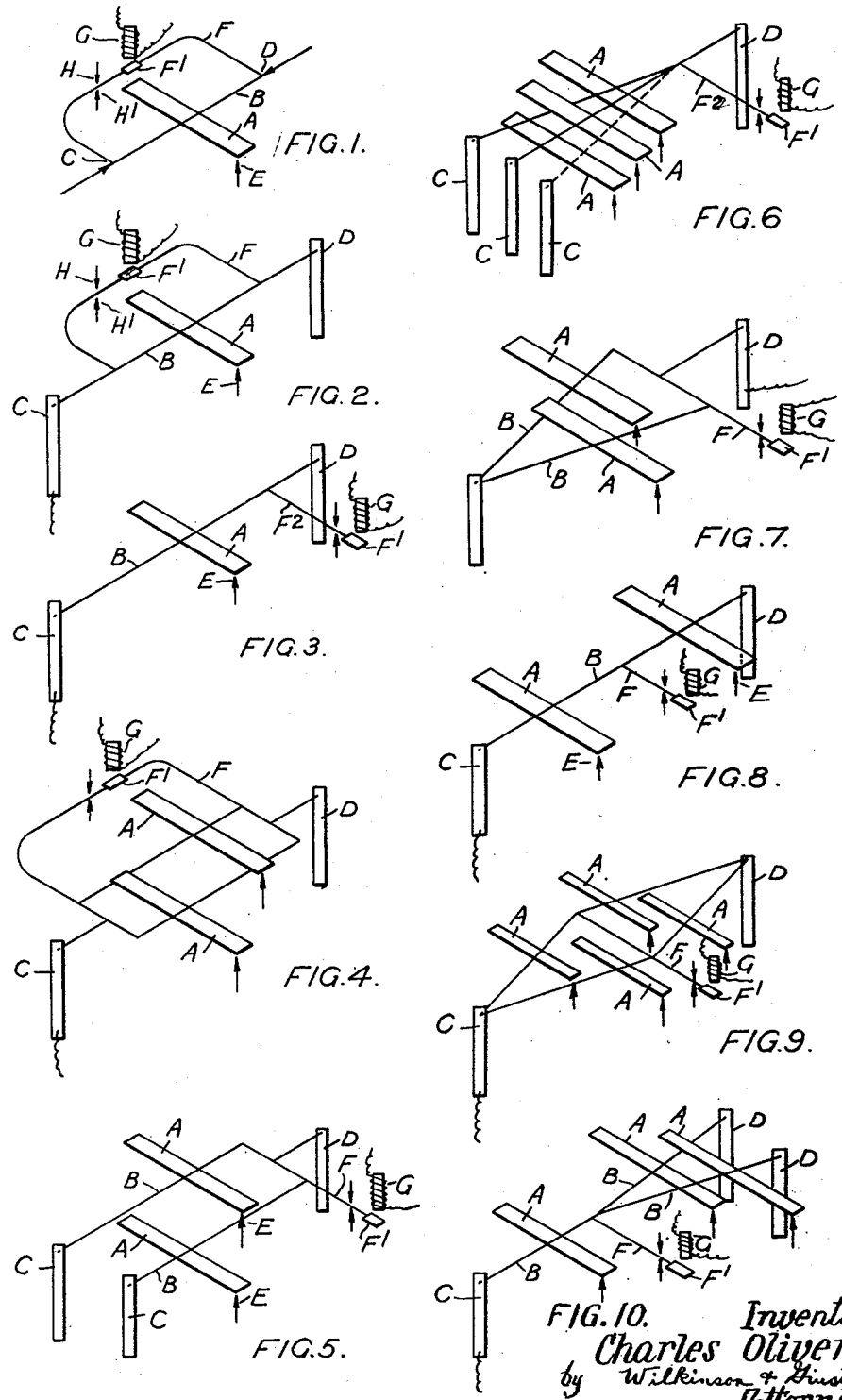

May 18, 1926. 1,585,508
C. OLIVER
RESONANCE ARRANGEMENT PARTICULARLY APPLICABLE TO ELECTRIC RELAYS
Filed April 18, 1924   2 Sheets-Sheet 2

Inventor
Charles Oliver
by Wilkinson & Giusta
Attorneys.

Patented May 18, 1926.

1,585,508

UNITED STATES PATENT OFFICE.

CHARLES OLIVER, OF CHISLEHURST, ENGLAND.

RESONANCE ARRANGEMENT PARTICULARLY APPLICABLE TO ELECTRIC RELAYS.

Application filed April 18, 1924. Serial No. 707,498.

This invention relates to improvements in resonance arrangements or mechanisms having tuned oscillating members capable of attaining an amplitude of vibration when set in motion by external means which may be operated from a distance or otherwise. Such arrangements are particularly applicable to selective electric relays controlled from a distance by means of pulsating electric currents.

Resonance arrangements in accordance with this invention are adapted to function in positions where they are subject or not to outside movement or vibration, and as they can be operated with a relatively small amount of applied energy are particularly suitable for use on electric supply systems in which mechanisms are or may be operated from a distant control point by means of pulsations of electrical energy superimposed upon the ordinary electrical currents flowing in a supply system or imposed upon the conductors of such system when no current is flowing.

A resonance arrangement according to the present invention comprises broadly an elongated member having torsional elasticity under longitudinal tension and rigidly secured at each end against rotation, a mass fixedly mounted on said member with the centre of said mass substantially coincident with the axis of said member in suchwise that said mass is balanced, and has a natural periodicity of oscillation about the axis of said member and means, independent of said mass, and operating within defined limits to apply a re-current torsional strain to said member at a frequency corresponding to the natural periodicity of said mass.

The member having torsional elasticity is preferably a wire, for example hard drawn nickel wire of say 35 B. W. gauge, either in the form of a straight length or a helix of small cross-section, possessing little longitudinal elasticity when under lengthwise tension.

The mass may be a light rod or strip rigidly secured transversely to the wire.

Its natural periodicity of oscillation will depend upon (a) the mass itself and (b) the torsional inertia of the wire.

For convenience of description I shall hereinafter refer to the wire or the like with the mass thereon as the "reed," to the wire or the like alone as the "torsional element," and to the mass as the "driven element." I employ also another element which I shall term the "driver," by which I impart to the "reed" a rotative movement of an oscillating description about the axis of the torsional element whereby the driven element may be caused to attain a certain amplitude of vibration when the frequency of the impulse applied as aforesaid corresponds sufficiently exactly to the actual periodicity of the reed.

The movement of this "driver" should be confined within limits since the strength of an impulse applied to the driver may vary. This limitation of movement may be effected by providing fixed stops between which the driver oscillates.

In order to secure an automatic registration, if desired, when the driven element has reached its required amplitude of oscillation, I may employ an electrical contact on the driven element preferably at some distance from its centre of oscillation so that said contact may touch or approach another fixed electrical contact when the required amplitude has been attained and thus serve to close an electrical circuit for actuating any desired mechanism or doing any useful work; and in this connection I may cause the touching of said contacts to energize a coil of an electro-magnet which will then hold the said contacts together until the desired switching or other operation has been performed.

The movable contact may alternatively be fixed upon an arm attached independently to the torsional element if desired.

The driver may be mounted upon the torsional element at some distance from the driven element or the driver and driven elements may be combined in any suitable manner. Furthermore a single driver may be arranged in conjunction with a number of driven elements having different periodicities, so that any one of said driven elements may be actuated by varying the frequency of the pulsations applied to the driver.

The present invention will be more clearly understood by reference to the accompanying drawings in which:—

Figs. 1 to 10 show various ways of mounting the several elements of my improved resonance device.

In these drawings like letters of reference indicate the same or equivalent parts throughout.

Figs. 1, 2, and 3 show simple forms of the invention in which the driven element A, which may be a thin metal rod or strip, is mounted e. g. by soldering, on a wire B which is stretched or held under longitudinal tension between the constraining points C and D. E designates a fixed contact which the driven element A touches when it has attained its required amplitude of oscillation.

In Figs. 1 and 2 the driver is shown as consisting of a loop or stirrup F fixed to the torsional element B near the constraining points and carrying an armature $F^1$ influenced by an electro-magnet G. The vibratory movement of driver F in response to successive excitations of the electro-magnet G is limited or defined by the fixed stops H and $H^1$.

In Fig. 3 the driver simply consists of an arm $F^2$ instead of the stirrup F.

Fig. 4 shows two reeds the ends of which are joined by rigid cross pieces which are in turn attached by their centres to the constraining points C and D, the stirrup F with the armature $F^1$ being a driver common to both reeds.

In Fig. 5 each of two reeds is secured at one end to a separate constraining point and provided with a common driver $F^2$. In Fig. 6 three reeds each with a separate constraining point are driven by a common driver $F^2$.

The remaining Figs. 7 to 10 show alternative arrangements which are clear from the drawings without individual explanation.

Figure 11:
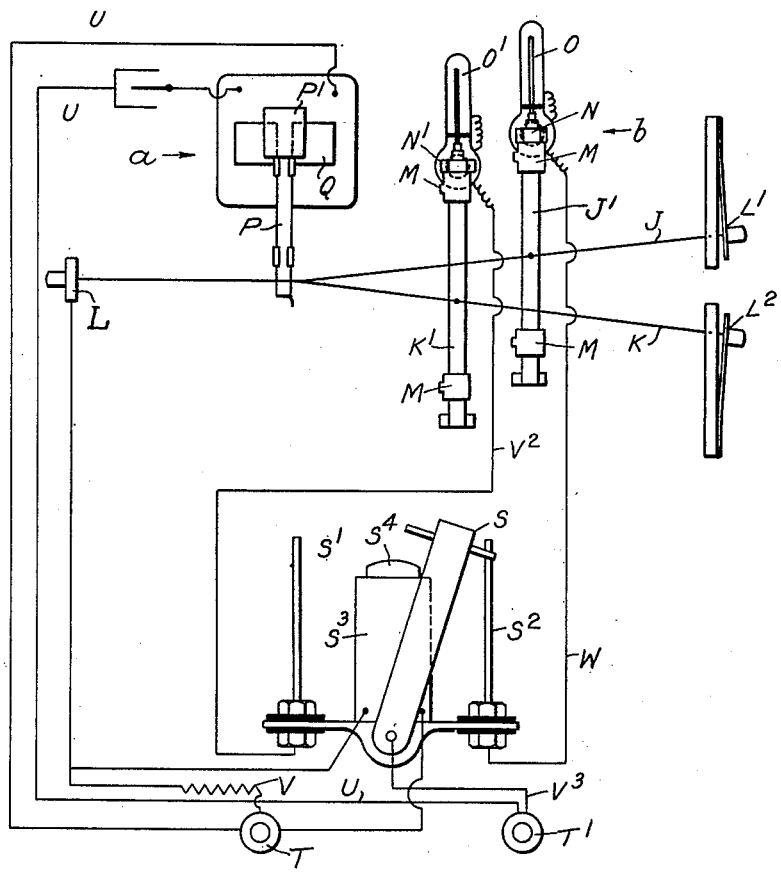
Fig. 11 shows diagrammatically one practical application of this invention.
Figure 12:
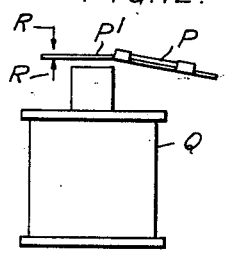
Fig. 12 is a local side view looking in the direction of the arrow $a$ Fig. 11.
Figure 13:
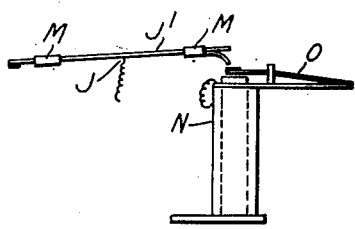
Fig. 13 is a local side view looking in the direction of the arrow $b$ Fig. 11.

Referring now to Figs. 11 to 13 which show an application of the invention to apparatus suitable say, for operating a switch for example in an electric supply system the apparatus being operable from a distance if desired.

Wires or torsional elements J and K are held under longitudinal tension between the standard L, serving as a common constraining point, and leaf springs $L^1$ and $L^2$. The driven elements $J^1$ and $K^1$ are fixed to the wires J and K and carry weights M arranged one on each arm, and advantageously slidably mounted thereon so that they can be moved towards and away from the centre of oscillation so as to adjust the natural periodicity of oscillation of said driven elements and to balance the mass upon the torsional elements. Adjacent one end of each driven element is arranged an electro-magnet marked N and $N^1$ respectively and the armatures of these electro-magnets are carried on adjacent ends of the driven elements $J^1$ and $K^1$. Preferably springs O and $O^1$ are mounted between the electro-magnets and their armatures, these springs serving as conductors in the electric circuits hereafter described.

At the point where the wires J and K join is mounted the arm P carrying the armature $P^1$ of an electro-magnet Q. This arm P serves as a driver for each of the reeds and is caused to oscillate between the stops R by successively energizing the electro-magnet Q at the required periodicity of either of the reeds.

An electro-magnetic switch of a well-known type is arranged in electrical circuits which include the torsional elements J and K, their respective driven elements $J^1$ and $K^1$, and the windings of electro-magnets N and $N^1$.

The arrangement acts as follows:—

Suppose that it is required to swing the pivoted switching armature S over to the contact $S^1$ for instance to change, from a distant control point, the registration of an electric meter from one dial to another.

The terminals T and $T^1$ are connected across the electric supply mains on which at the required time are impressed a series of current fluctuations corresponding to the natural period of the driven element $J^1$.

These fluctuations or ripples pass into the condenser circuit U which includes the winding of the electro-magnet Q. A series of impulses are thus applied to the driver P which imparts successive torsional stresses to the element J. The driven element $J^1$ is set oscillating at increasing amplitude as each successive impulse is applied until it touches the spring contact O, completing the circuit from terminal T through coil $S^3$, conductor $V^1$, standard L, torsional element J, driven element $J^1$, spring O, winding of the electro-magnet N, (which is thereby energized and holds driven element $J^1$ in contact) conductor W, contact $S^2$, armature S, conductor $V^3$ to terminal $T^1$. The coil $S^3$ being energized, the armature S swings over to contact $S^1$ the circuit through $S^2$ being broken and the driven element $J^1$ released.

When the reverse switching operation is required, the frequency of the fluctuation or ripple applied at the control point is made to correspond with the natural period of the driven element $K^1$ and the circuit when closed by the said element $K^1$ is—terminal T, coil $S^3$, conductor $V^1$, standard L, torsional element K, driven element $K^1$, spring $O^1$, winding of electro-magnet $N^1$, conductor $V^2$, contact $S^1$, armature S, conductor $V^3$, to terminal $T^1$.

What I claim is:—

1. A resonance arrangement comprising an elongate member having torsional elasticity under longitudinal tension and rigidly secured at each end against rotation, a mass fixedly mounted on said member with the centre of said mass substantially coincident with the axis of said member in such wise that the said mass is balanced, and has a natural periodicity of oscillation about the axis of said member, and means, independent of said mass and operating within defined limits, to apply a recurrent torsional strain to said member at a frequency corresponding to the natural periodicity of said mass.

2. A resonance arrangement comprising a wire having torsional elasticity under longitudinal tension and rigidly secured at each end against rotation, a rigid rod fixed transversely to, and with its centre of mass substantially at the axis of, said wire so as to be balanced about said axis and to oscillate when a torsional impulse is imparted to said wire, and an oscillatory device attached to said wire and operating within defined limits to apply successive torsional impulses to said wire, the movement of said oscillatory device being uncontrolled by any influence due to the same.

3. A resonance arrangement comprising a wire having torsional elasticity under longitudinal tension and secured at each end against rotation, a rigid rod fixed transversely to, and with its centre of mass substantially at the axis of, said wire so as to be balanced about said axis and to oscillate when a torsional impulse is imparted to said wire, an arm attached to said wire and arranged to be oscillated within defined limits by electro-magnetic means to apply successive torsional impulses to said wire.

4. A resonance arrangement comprising an elongate member having torsional elasticity under longitudinal tension, both ends thereof being fixed against rotation, a plurality of masses secured at their respective centres to said elongate member and having different periodicities of oscillation about the axis of said member, and means, independent of said masses and operating within defined limits to apply a recurrent torsional strain to said member at a frequency corresponding to the natural periodicity of any of said masses.

5. A resonance arrangement comprising a number of elongate members having torsional elasticity under longitudinal tension, both ends of each of said members being fixed against rotation, a separate mass secured at its centre to each respective member and each mass having a different periodicity of oscillation, and means common to all of said elongate members operating within defined limits and independently of said masses to apply a recurrent torsional strain to the elongate members at a frequency corresponding to the natural periodicity of any of said masses.

6. A resonance arrangement comprising a wire having torsional elasticity under longitudinal tension and secured at each end against rotation, a rigid rod fixed transversely to, and with its centre of mass substantially at the axis of, said wire so as to be balanced about said axis and to oscillate when a torsional impulse is imparted to said wire, an arm attached to said wire and caused to oscillate within defined limits to apply successive torsional impulses to said wire and an electrode arranged adjacent said rod, the latter and said wire forming part of an electrical circuit completed through said electrode when said rod attains the required amplitude of oscillation.

7. A resonance arrangement comprising a number of elongate members having torsional elasticity under longitudinal tension, both ends of said members being fixed against rotation, separate masses having different periodicities of oscillation secured at their centres to the respective elongate members so as to be balanced about the axes of said members, an oscillatory device operating within defined limits independently of said masses to apply a recurrent torsional strain to the elongate members at a frequency corresponding to the natural periodicity of any of said masses and an electrode arranged adjacent each said mass, all of the latter and their supporting members being included in electrical circuits completed through the respective electrode when any mass attains the required amplitude of oscillation.

8. A resonance arrangement comprising a wire having torsional elasticity under longitudinal tension and secured at each end against rotation, a rigid rod fixed transversely to, and with its centre of mass substantially at the axis of, said wire so as to be balanced about said axis and to oscillate when a torsional impulse is imparted to said wire, an arm attached to said wire and caused to oscillate within defined limits to apply successive torsional impulses to said wire, the movement of said arm or lever being uncontrolled by any influence due to the mass, and an electro-magnet arranged adjacent said rod so that upon the latter attaining the required amplitude of oscillation it contacts with said electro-magnet and is held by the latter a circuit being completed thereby.

9. A resonance arrangement comprising a number of elongate members having torsional elasticity under longitudinal tension, both ends of said members being fixed against rotation, separate masses having different periodicities of oscillation and secured at their centres to the respective elongate members so as to be balanced about the axes of said members, an oscillatory device operating within defined limits and independently of said masses to apply a recurrent torsional strain to the elongate members at a frequency corresponding to the natural periodicity of any of said masses and an electromagnet arranged adjacent each of said masses so that any one of the latter upon attaining the required amplitude of oscillation makes contact with its respective electro-magnet and is held by the latter, thereby completing a circuit.

CHARLES OLIVER.